(12) United States Patent
Jørgensen et al.

(10) Patent No.: US 11,841,000 B2
(45) Date of Patent: Dec. 12, 2023

(54) METHOD AND A DEVICE FOR DAMPENING MOVEMENT IN A MULTIPLE ROTOR WIND TURBINE LOCATED AT SEA

(71) Applicant: Vestas Wind Systems A/S, Aarhus N (DK)

(72) Inventors: Brian Jørgensen, Galten (DK); Søren Dalsgaard, Hadsten (DK); Peter Bøttcher, Egå (DK); Julio Xavier Vianna Neto, Århus N (DK); Anders Yde Wollesen, Aarhus C. (DK)

(73) Assignee: Vestas Wind Systems A/S, Aarhus N (DK)

( * ) Notice: Subject to any disclaimer, the term of this patent is extended or adjusted under 35 U.S.C. 154(b) by 56 days.

(21) Appl. No.: 17/782,230

(22) PCT Filed: Dec. 11, 2020

(86) PCT No.: PCT/DK2020/050352
§ 371 (c)(1),
(2) Date: Jun. 3, 2022

(87) PCT Pub. No.: WO2021/121501
PCT Pub. Date: Jun. 24, 2021

(65) Prior Publication Data
US 2023/0009080 A1    Jan. 12, 2023

(30) Foreign Application Priority Data

Dec. 20, 2019 (DK) .................. 2019 70819

(51) Int. Cl.
*F03D 13/25* (2016.01)
*F03D 13/10* (2016.01)
(Continued)

(52) U.S. Cl.
CPC .............. *F03D 13/25* (2016.05); *F03D 1/02* (2013.01); *F03D 7/0296* (2013.01); *F03D 13/10* (2016.05);
(Continued)

(58) Field of Classification Search
CPC ........ F03D 13/25; F03D 1/02; F05B 2240/37; F05B 2240/95; F05B 2260/964; Y02E 10/727
See application file for complete search history.

(56) References Cited

U.S. PATENT DOCUMENTS

| | | | |
|---|---|---|---|
| 7,075,189 B2 * | 7/2006 | Heronemus | B63B 35/44 290/55 |
| 7,238,009 B2 * | 7/2007 | Schellstede | F03D 13/25 415/4.1 |

(Continued)

FOREIGN PATENT DOCUMENTS

| | | |
|---|---|---|
| DE | 102008008760 A1 | 8/2009 |
| DE | 102012020052 B3 | 4/2014 |

(Continued)

OTHER PUBLICATIONS

Danish Patent and Trademark Office, Search and Examination Report in PA 2019 70819, dated Jun. 11, 2020.

(Continued)

*Primary Examiner* — Pedro J Cuevas
(74) *Attorney, Agent, or Firm* — Wood Herron & Evans LLP (57) ABSTRACT

A method and a device for dampening movement in a multiple rotor (MR) wind turbine located at sea and comprising a tower (2) extending in an upwards direction, a load carrying structure (3, 4) forming a first section (3) and a second section (4), the first and second sections extending in different directions away from the tower (2). To provide (Continued)

efficient dampening of the movement, the method comprises tethering a first body (20) to the first section (3), the first body being at least partly submerged into the sea.

33 Claims, 11 Drawing Sheets (51) Int. Cl.
*F03D 1/02* (2006.01)
*F03D 7/02* (2006.01)

(52) U.S. Cl.
CPC ....... *F05B 2240/37* (2020.08); *F05B 2240/95* (2013.01); *F05B 2260/964* (2013.01)

(56) References Cited

U.S. PATENT DOCUMENTS

| | | | | |
|---|---|---|---|---|
| 8,471,396 | B2* | 6/2013 | Roddier | F03D 13/10 290/44 |
| 8,692,401 | B2* | 4/2014 | Roddier | E02B 9/00 290/44 |
| 8,794,875 | B2* | 8/2014 | Fraenkel | E02D 27/52 405/203 |
| 9,522,716 | B2* | 12/2016 | Rodríguez Tsouroukdissian | B63B 39/005 |
| 9,624,906 | B2* | 4/2017 | Pineda Amo | F03D 13/22 |
| 9,732,730 | B2* | 8/2017 | Friedrich | F03D 13/22 |
| 9,777,711 | B2* | 10/2017 | Rossetti | B63B 21/50 |
| 9,938,960 | B2* | 4/2018 | Gabeiras | B63B 39/02 |
| 11,014,637 | B2* | 5/2021 | Boo | B63B 39/06 |
| 11,286,636 | B2* | 3/2022 | Bartminn | F03D 13/22 |
| 11,300,100 | B2* | 4/2022 | Sørensen | F03D 7/0224 |
| 11,486,362 | B2* | 11/2022 | Siegfriedsen | F03D 13/25 |
| 2003/0168864 | A1* | 9/2003 | Heronemus | F03D 9/255 290/55 |
| 2006/0115363 | A1* | 6/2006 | Schellstede | E02B 17/027 416/244 R |
| 2007/0001464 | A1* | 1/2007 | Kothnur | F03D 13/22 290/55 |
| 2008/0240864 | A1* | 10/2008 | Belinsky | F03D 13/22 290/55 |
| 2011/0037266 | A1* | 2/2011 | Wille | F03B 13/14 290/53 |
| 2011/0133475 | A1* | 6/2011 | Zheng | E04H 12/10 290/55 |
| 2012/0073487 | A1* | 3/2012 | Pantaleon Prieto | F03D 13/25 114/264 |
| 2012/0171034 | A1* | 7/2012 | Gabeiras | B63B 43/06 416/9 |
| 2012/0187693 | A1* | 7/2012 | Houvener | F03D 13/25 416/85 |
| 2012/0279434 | A1 | 11/2012 | Lebon et al. | |
| 2013/0236309 | A1* | 9/2013 | Rossetti | B63H 25/42 416/43 |
| 2014/0017083 | A1* | 1/2014 | Pineda Amo | G01C 19/02 416/37 |
| 2014/0091576 | A1* | 4/2014 | Wille | F03D 13/25 290/53 |
| 2014/0137789 | A1* | 5/2014 | Hewitt | B63G 8/001 114/333 |
| 2014/0219797 | A1* | 8/2014 | Friedrich | F03D 13/25 416/31 |
| 2015/0136006 | A1* | 5/2015 | Rodriguez Tsouroukdissian | B63B 39/06 114/121 |
| 2017/0342957 | A1* | 11/2017 | Baldock | F03B 17/061 |
| 2017/0356416 | A1* | 12/2017 | Fan | F03B 17/061 |
| 2018/0017042 | A1 | 1/2018 | Baun et al. | |
| 2018/0363622 | A1 | 12/2018 | Baun | |
| 2019/0127032 | A1 | 5/2019 | Prieto et al. | |
| 2019/0338482 | A1 | 11/2019 | Lund et al. | |
| 2020/0240102 | A1* | 7/2020 | Bartminn | E04H 12/00 |
| 2020/0269960 | A1* | 8/2020 | Boo | B63B 39/00 |
| 2020/0318613 | A1* | 10/2020 | Sørensen | F03D 7/0264 |
| 2021/0156360 | A1* | 5/2021 | Siegfriedsen | F03D 13/25 |
| 2021/0270236 | A1* | 9/2021 | Neto | F03D 1/02 |
| 2021/0387702 | A1* | 12/2021 | Allen | B63B 39/02 |
| 2022/0297802 | A1* | 9/2022 | Liegard | F03D 13/25 |
| 2023/0003193 | A1* | 1/2023 | Neto | G05B 13/048 |
| 2023/0035973 | A1* | 2/2023 | Neto | F03D 1/02 |
| 2023/0049381 | A1* | 2/2023 | Aubault | B63B 13/00 |
| 2023/0105529 | A1* | 4/2023 | Esbensen | F03D 7/0204 290/44 |
| 2023/0113147 | A1* | 4/2023 | Ghazizadeh | B63B 35/44 114/265 |
| 2023/0141253 | A1* | 5/2023 | Kanner | B63B 35/44 114/264 |
| 2023/0141340 | A1* | 5/2023 | Kanner | F03D 7/0224 290/44 |
| 2023/0160368 | A1* | 5/2023 | Ludwigsson | B63B 1/107 290/55 |
| 2023/0204013 | A1* | 6/2023 | Vik | B63B 35/44 416/85 |

FOREIGN PATENT DOCUMENTS

| | | | | |
|---|---|---|---|---|
| EP | 2472105 | A2 * | 7/2012 | ............ B63B 39/02 |
| EP | 3394426 | A1 | 10/2018 | |
| ES | 2391332 | A1 * | 11/2012 | ............ B63B 39/02 |
| GB | 2443886 | A | 5/2008 | |
| WO | 2019076586 | A1 | 4/2019 | |
| WO | WO-2021121500 | A1 * | 6/2021 | |

OTHER PUBLICATIONS

European Patent Office, International Search Report and Written Opinion in PCT Application No. PCT/DK2020/050352, dated Mar. 16, 2021.

* cited by examiner

METHOD AND A DEVICE FOR DAMPENING MOVEMENT IN A MULTIPLE ROTOR WIND TURBINE LOCATED AT SEA

INTRODUCTION

The disclosure relates to a method of dampening movement in a multiple rotor (MR) wind turbine located at sea.

BACKGROUND

MR wind turbines typically comprise a tower extending in an upwards direction and one or more load carrying arm structures each forming two sections. A first section extends in one direction away from the tower and holds at least one nacelle, and a second section extends in a different direction away from the tower and holds at least one nacelle.

Wind turbines, particularly of this kind, may move unintentionally, e.g. in case of being hit by a dropped nacelle during installation.

On MR wind turbines, the impact is potentially a large deflection of the load carrying structure caused by the mass of the nacelle hitting the load carrying structure during assembly. The interface is often in the range of approximately half a rotor diameter away from the tower, and the moments introduced in the interface between the tower and the load carrying structures can be large. As a result, the interface where the nacelle meets the load carrying structure may move several meters during deflection of the tower and the load carrying structure. If, by accident, the nacelle slides off and drops to or at least towards the ground or sea, the load on the interface is suddenly released, causing an opposite reaction movement of the tower and load carrying structures. The effect of the equilibrium position without the nacelle being higher up prior to the impact and then lower down after the mass force is exerted on the structure provides a peak load which can damage the load carrying structure.

To counteract such peak load reactions, the tower and load carrying structures would need to be reinforced severely, adding extensively to the costs of making an MR wind turbine.

SUMMARY

It is an object to reduce movement of the load carrying structure, and particularly to reduce the impact of sudden release of load on the interface where the nacelle meets the load carrying structure, in the following referred to simply as "interface".

According to this and other objects, the disclosure, in a first object provides a method comprising tethering a first body which is submerged into the sea by a wire which is attached to the first section.

The movement of the tower and load carrying structures is thereby limited by a hydraulically dampened counterforce, e.g. if a nacelle drop occurs. This dampened counterforce is applied by the tethered body which is submerged into the sea, and arises as a result of the drag and/or inertia forces as the body travels through the water. In case of nacelle drop, the downward movement of one of the sections is limited if the body is attached to the opposite section, and the upwards movement of a section may be limited if the body is attached to that section.

The method may comprise tethering a second body to the second section. The second body may also be at least partly submerged into the sea. The second body may prevent upwards movement of the second section and thereby prevent downwards movement of the first section.

If the first body is tethered to the first section while the second body is tethered to the second section, both downward movement and upwards movement of the first section can be dampened.

A nacelle may be mounted to the second section while the first body is tethered to the first section or while the second body is tethered to the second section. This is particularly advantageous for mitigating the impact of a nacelle drop during mounting of a nacelle on a MR wind turbine.

The nacelle may also be mounted to the first section while the first body is tethered to the first section or while the second body is tethered to the second section.

When the nacelle is mounted, the method may comprise the step of removing at least one of the first body and the second body, thereby only using the dampening effect of the body during mounting of the nacelle.

At least one of the first and second bodies may have a shape such that the drag coefficient in a vertical downwards direction is different from the drag coefficient in a vertical upward direction. Additionally, at least one of the first and second bodies may have a shape reducing sideways drag as compared to vertical drag.

This may be provided by various shapes and various mechanisms as will be described in the following.

Particularly, the drag coefficient may be reduced in a vertical downwards direction.

At least one of the first body and the second body may have a tapering shape with a cross sectional area being reduced in a vertical downwards direction. This provides a higher flow resistance against rising movement than descending movement of the body.

At least one of the first body and the second body may have a tapering shape with a cross sectional area being reduced in a vertical upwards direction. This provides a lower flow resistance against rising movement than descending movement of the body.

The shape of at least one of the first body and the second body may be changed dynamically.

The shape may be changed dynamically by a flow of water over a surface of the body.

The changed in shape may be a result of a force acting on an attachment point by which the first body and/or the second body is tethered to the first section or second section by a wire e.g. by triggering a folding mechanism by a pull in the wire in which the body is suspended from the load carrying structure.

At least one of the first body and the second body may be non-buoyant, or at least one may be buoyant and configured to be filled with water to become non-buoyant.

At least one of the first body and the second body may form an essentially planner and horizontal surface portion.

At least one of the first body and the second body may be tethered from a tip end of the first section or the second section. This may provide a large moment about the attachment point where the load carrying structure is attached to the tower.

In a second aspect, the disclosure provides a multi rotor wind turbine located at sea and comprising a tower extending in an upwards direction, a load carrying structure forming a first section and a second section, the first and second sections extending in different directions away from the tower, and at least one body which is tethered by a wire to one of to the first section and second section, the at least one body being at least partly submerged into the sea.

LIST OF DRAWINGS

The disclosure will now be described in further detail with reference to the accompanying drawings in which.

DETAILED DESCRIPTION OF THE DRAWINGS

Figure 1:
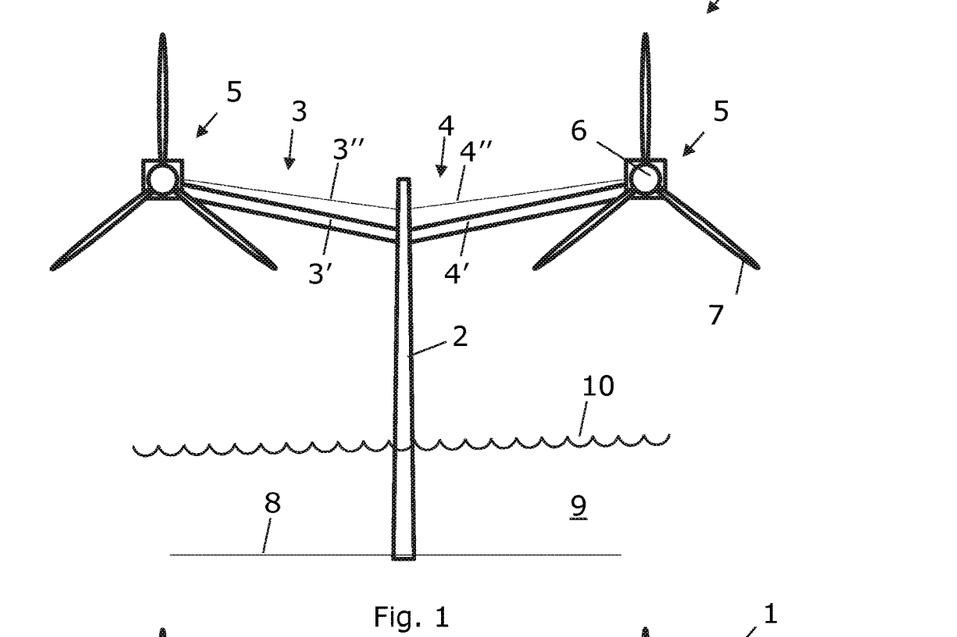
FIG. 1 illustrates a front view of a MR wind turbine.

FIG. 1 illustrates a front view of a MR wind turbine 1 comprising a tower 2 carrying two load carrying structures 3. The disclosed MR wind turbine is an MR 2 turbine meaning that it carries 2 energy generating units. It may just as well carry more units, e.g. 3 or 4 units, e.g. two rows of two units in different altitude, e.g. comprising lower and upper load carrying structures.

The load carrying structures extend in opposite outwards directions away from the tower 2.

The load carrying structure comprises a first section 3', 3" and a second section 4', 4". Each section supports a nacelle 5, and each nacelle 5 forms an energy generating unit including a rotor 6 carrying three wind turbine blades 7, sweeping an area.

The load carrying structures 3', 3", 4', 4" are attached to the tower 2 via a yaw arrangement, allowing the entire pair of load carrying structures to perform yawing movements with respect to the tower 2 in order to direct the rotors 6 into the incoming wind.

When the multirotor wind turbine 1 is operational, the nacelles 5 are placed symmetrically around the tower 2 so that the multirotor wind turbine is balanced.

Each section of the load carrying structures 3, 4, includes a first part 3', 4' and a second part 3", 4". The first part 3', 4' acts as compression elements and it is supported by the second part 3", 4" forming a tension element in the form of two guy wires extending from a swivel arrangement on the tower.

The MR wind turbine is an off-shore MR wind turbine placed on the sea bed 8 and with the tower or a tower foundation extending through the water 9 and through the water surface 10.

Figure 2:
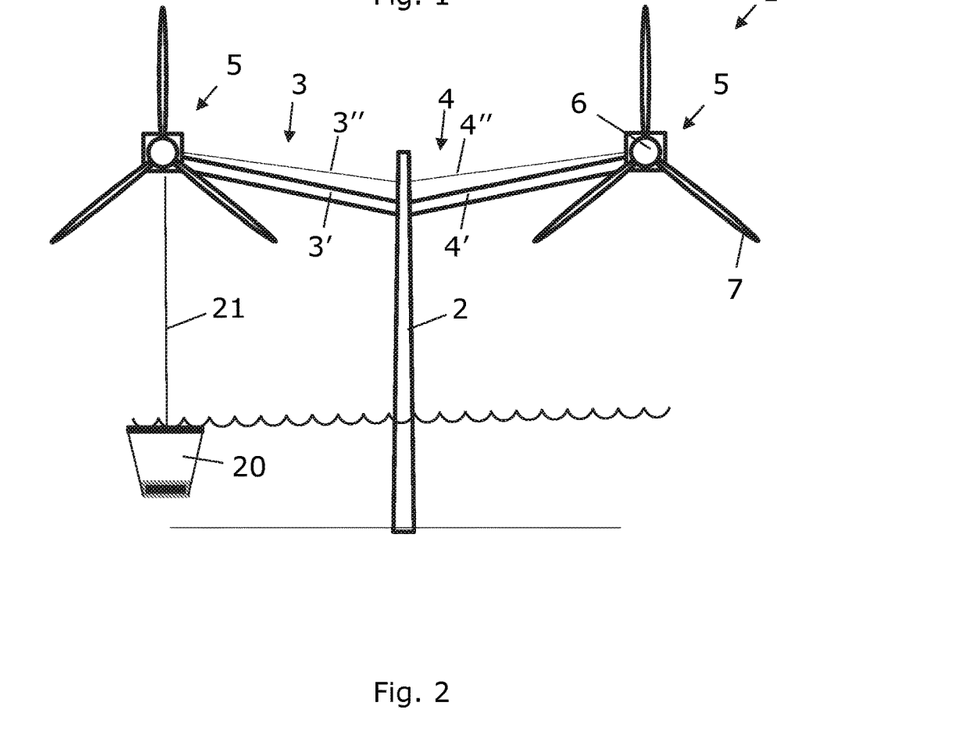
FIGS. 2-21 illustrate different embodiments of the body and its use for attaching a nacelle.

FIG. 2 illustrates an MR wind turbine with a first body 20 which is tethered to the first section 3 by use of a wire 21. The first body is submerged into the sea, and upwards or downwards movement of the body is therefore dampened by the flow of water over the surface of the body and by the weight of the body. Even though the disclosed first body 20 is fully submerged, it could also be partly submerged and thereby form a section above the sea level.

The wire 21 is attached to the area of the first section 3 where the nacelle is mounted on the first section 3. The wire could be made of various materials, e.g. steel wire rope, synthetic rope such as nylon rope. It may be an advantage if it floats if dropped into the water and a light-weight may also make it easier to handle.

The body could be made of various materials, e.g. steel, or synthetic materials including fibre glass reinforced plastic etc. It may be an advantage if it has a low weight, e.g. such that it floats if dropped into the water, and by filling with water becomes non-buoyant and sinks.

The first body 20 has a tapering shape with a cross sectional area being reduced in a vertical downwards direction. This provides a lower water resistance when sinking than when being pulled upwards. Due to the flow of water over the surface of the first body 20, and due to the weight of the first body 20, it dampens movement of the MR wind turbine and particularly dampens movement of the tip end of the first section 3 of the load carrying structure.

Figure 3:
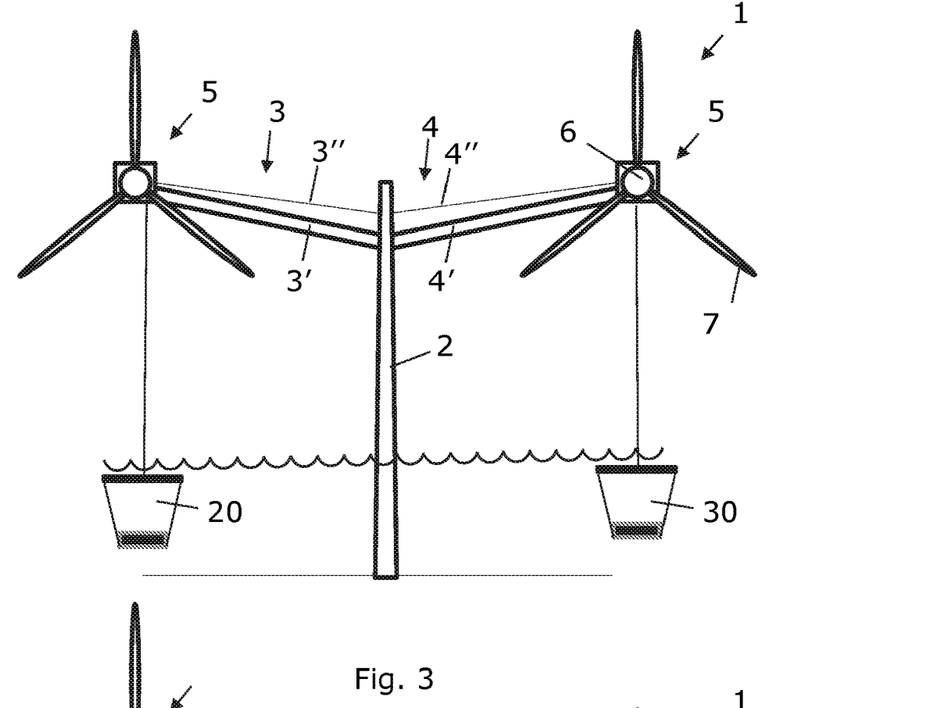

FIG. 3 illustrates an embodiment where a second body 30 is tethered to the second section 4. The second body 30 is at least partly submerged into the sea. Both the first and the second body provide dampening of movement of the MR wind turbine.

If, during installation of the MR wind turbine, the nacelle is dropped during the mounting process, different scenarios may occur:

1. The nacelle may be dropped onto the section on which it is being mounted and subsequently fall onto the ground or into the ocean. In this scenario, the section will be deflected downwards and will swing back upwards.

2. The nacelle may fall off the section on which it is being mounted after the load from the nacelle is at least partly transferred to the load carrying structure. This sudden release of load on the section of the load carrying structure would again cause a rapid upwards swing of that section of the load carrying structure, while the other section would swing downwards.

In both scenarios, the load carrying structure and the tower would be stressed, and the dampening provided by at least one of the first and second bodies 20, 30 mitigates impact of a nacelle drop and thereby facilitates a safer assembly operation or a lighter wind turbine construction.

Figure 4:
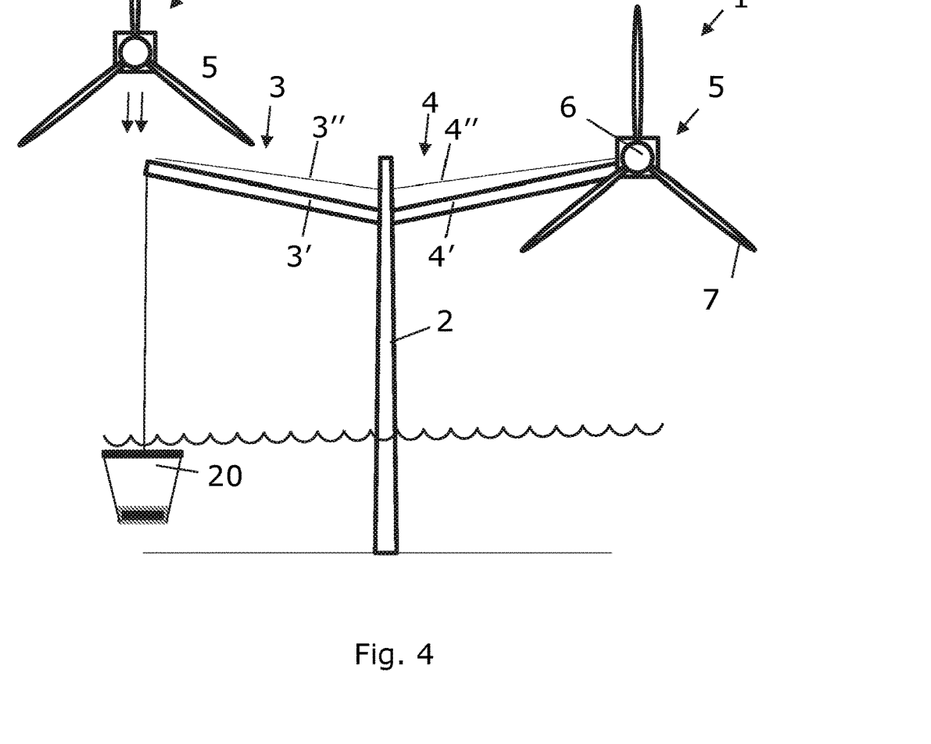
Figure 5:
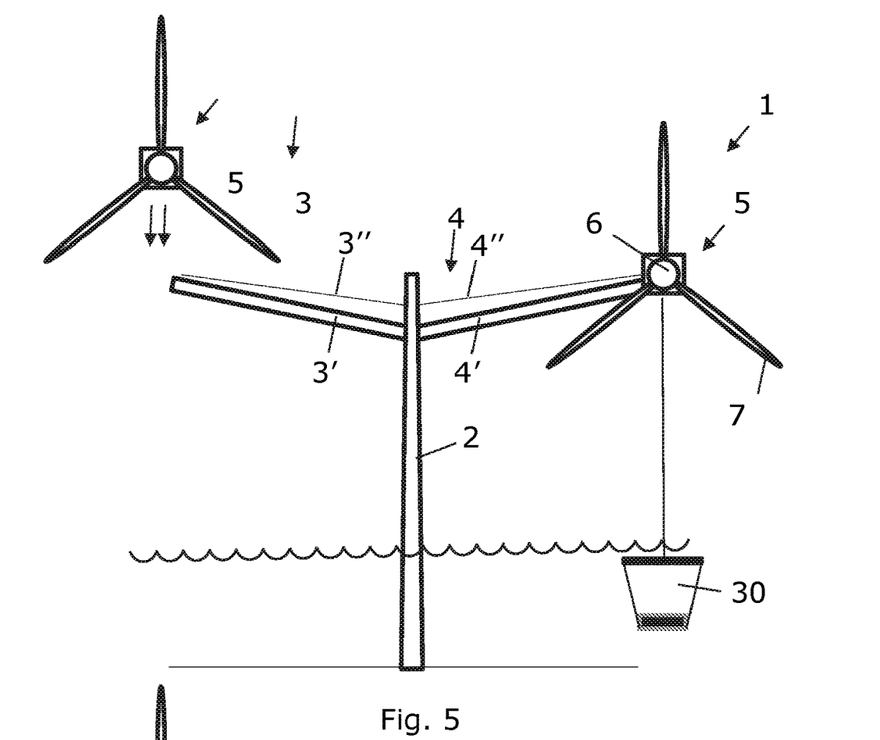

The first and/or the second bodies 20, 30 may particularly be used for a short period of time when a nacelle is mounted to the load carrying structure. This is illustrated in FIG. 4. In this illustration, a nacelle is mounted to the first section 3 while the first body is tethered to the first section 3. FIG. 5 illustrates the same situation but while the second body 30 is tethered to the second section 4.

In the following description, we refer to first section as that section of the load carrying structure on which the nacelle is to be attached, and the second section as that section of the load carrying structure where there is either no nacelle, or where a nacelle is already attached.

Figure 6:
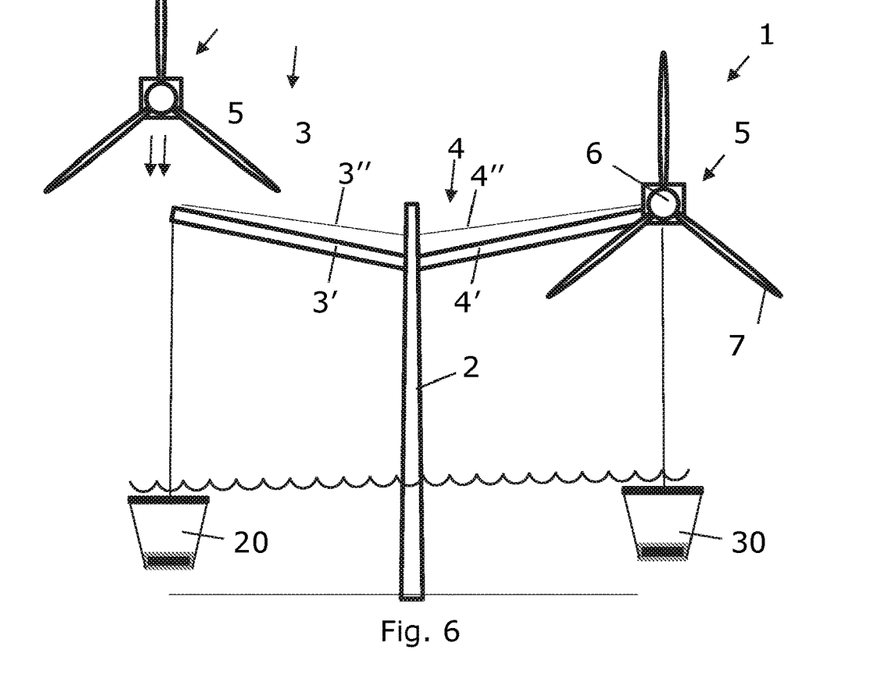

FIG. 6 illustrates mounting of the nacelle by use of both the first and the second body 20, 30. The first and second bodies may be identical, or they could be different. They may e.g. have different size, shape, or weight, and one or both of them may be active or passive as will be discussed later.

To prevent the bodies from drifting sideways, one or both of the first and second bodies may be tethered to the seabed by a slack line or via a spring structure, or an additional mass may be fixed at the end of the wire 21 below the bodies.

In FIGS. 7-13, only one nacelle and body are shown for the purpose of discussing various details of the body. It could be either one of said first or second bodies 20, 30. In the following reference is simply made to "the body" without naming it further.

Figure 7:
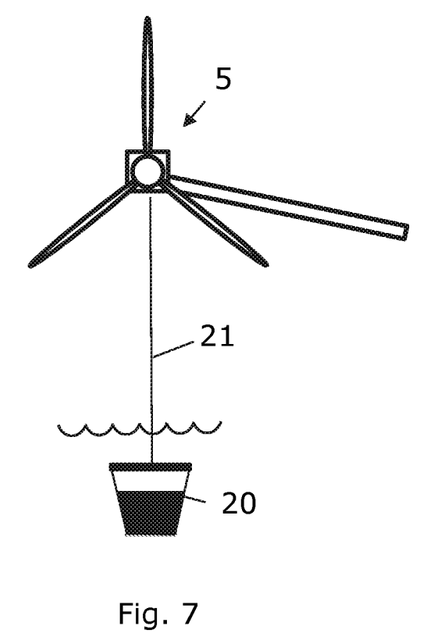

FIG. 7 illustrates the body is partly filled with water and is therefore shiftable between a buoyant state and a less buoyant or non-buoyant state.

Figure 8:
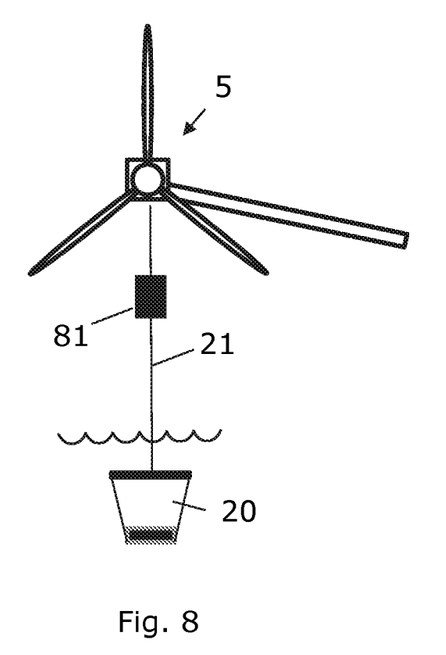

FIG. 8 illustrates the body suspended in a wire 21 which encompass a further dampening device 81 which could be a rubber or spring-based damper or a viscous damper.

Figure 9:
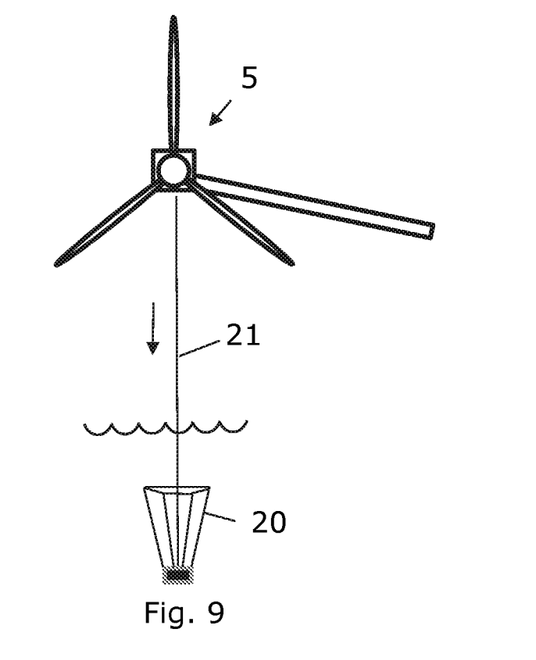
Figure 10:
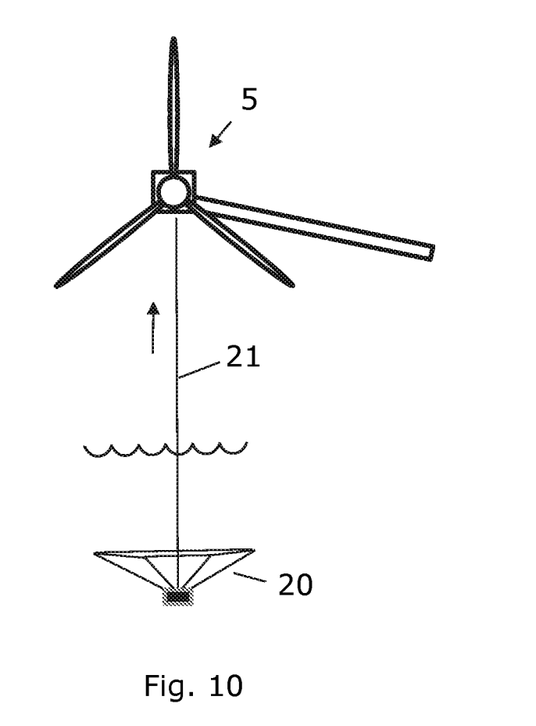

FIGS. 9 and 10 illustrate an embodiment where the body has an umbrella structure allowing it to fold during decent into the sea, illustrated in FIG. 9 and to unfold during rise as illustrated in FIG. 10. This provides a much higher flow resistance upon rising movement and thereby dampens upwards motion of the section of the load carrying structure to which it is attached.

Figure 11:
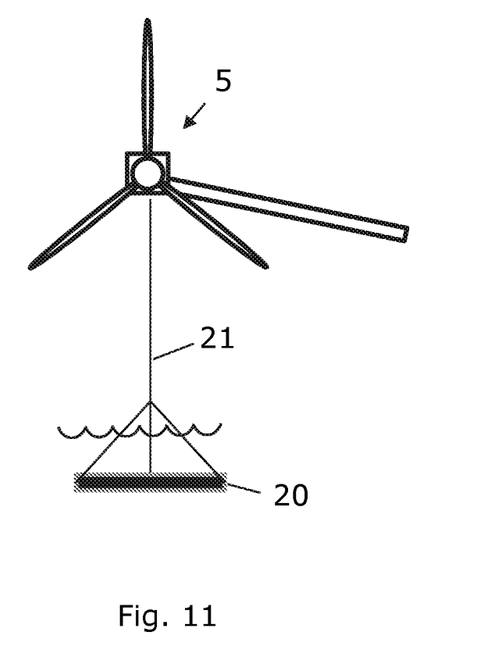
Figure 12:
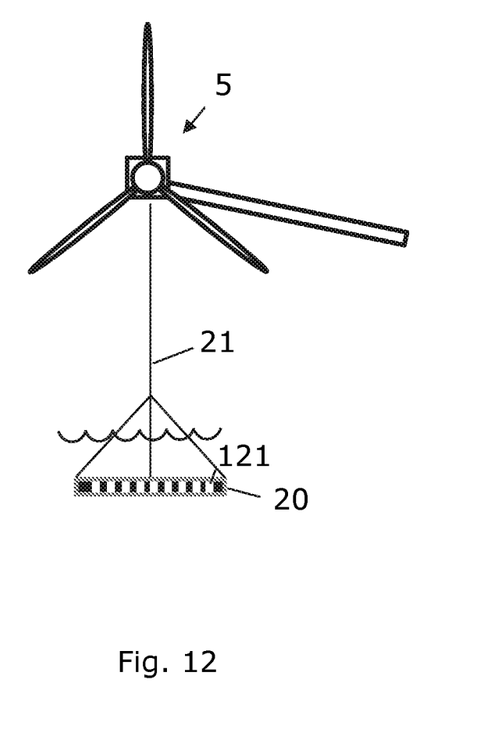
Figure 13:
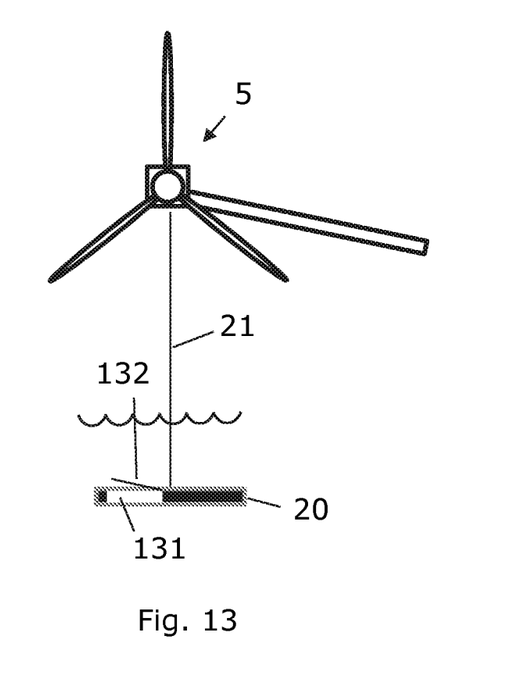

FIGS. 11-13 illustrate different embodiments of plate shaped bodies. In FIG. 11, the plate shaped body is solid and non-buoyant.

In FIG. 12 the plate shaped body is solid and non-buoyant but includes a number of holes 121 forming a perforated structure allowing water to pass the plate.

In FIG. 13 the plate shaped body is solid and non-buoyant but includes a controllable hatch structure with a hatch opening 131 allowing flow of water through the body, and a hatch 132 controlling the flow rate by opening and closing the hatch opening. In the illustrated embodiment, the hatch 132 is passive movable by the flow of the water and will open upon sinking and close upon rising movement of the body.

Figure 14:
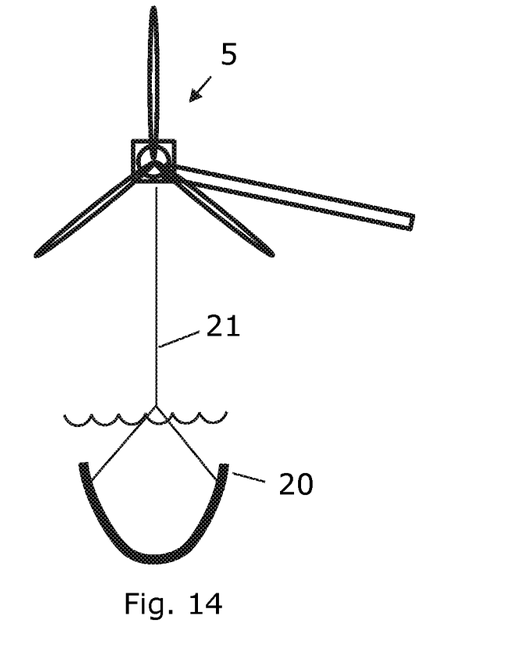

FIG. 14 illustrates a conical shape providing a smaller drag coefficient in a vertical downwards direction compared to a vertical upwards direction, due to convexity. The shape is fixed, and the cross-sectional area therefore does not change.

Figures 15, 16:
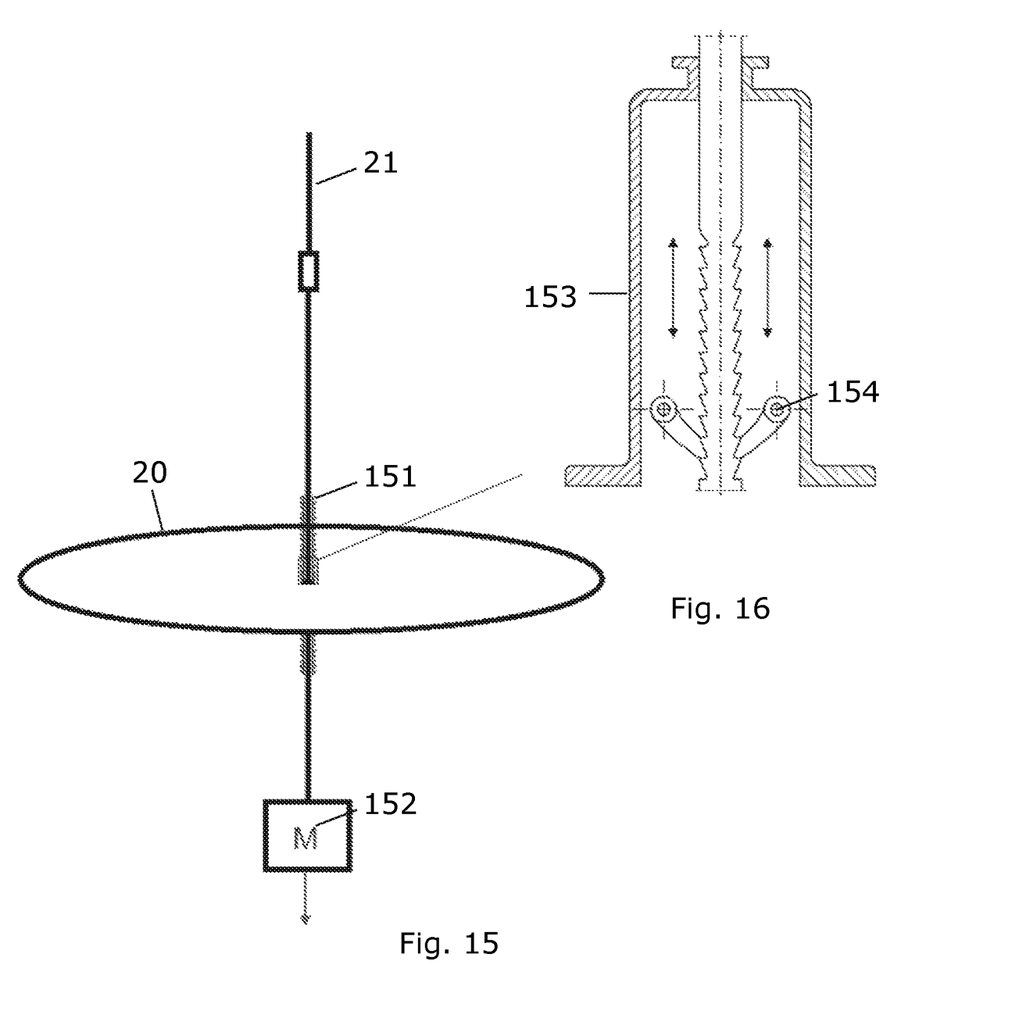

FIG. 15 illustrates an embodiment where at least one of the first and second bodies is controlled. In this embodiment, the wire 21 comprises a rigid section 151 and a mass 152 providing a pull-down force illustrated by the arrow. The rigid section 151 is shown in further details in FIG. 16. It extends through the body, in this example the first body 20, and a crawling mechanism 253 attached to the first body is configured to allow the wire to slide downwardly through the first body and to engage and lift the first body 20 when the wire 21 pulls upwardly. A mechanism may open and close the ratchet structure 154 and thereby, in a controlled manner allow the wire to be pulled upwardly through the first body depending on the need for dampening of the movement of the load carrying structure. The illustrated embodiment allows control of the force in the wire and thus control of the dampening of the movement of the load carrying structure.

In an alternative embodiment, the force in the wire can be controlled by a winch structure arranged to wind the wire 21 in or out. This winch may particularly be arranged at the nacelle or on the load carrying structure close to the location where the nacelle is attached or where the nacelle is to be attached. The winch may be controlled based on acceleration of the load carrying structure, particularly based on acceleration at the position where the nacelle is attached or where the nacelle is to be attached. Alternatively, the winch may be controlled based on tension of the wire 21.

Figure 17:
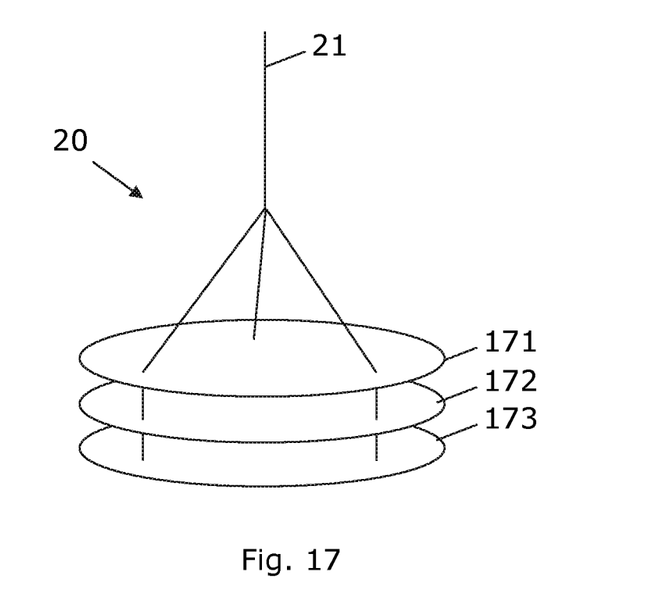

FIG. 17 illustrates an embodiment where one of the first and second bodies, in this case the first body 20 is constituted by a plurality of planar plate shaped elements 171-173. The elements could also be curved, conical, parabolic, or semi-spherical elements, or the body could be constituted by a combination between plate shaped elements and/or curved, conical, parabolic, or semi-spherical elements.

Figure 18:
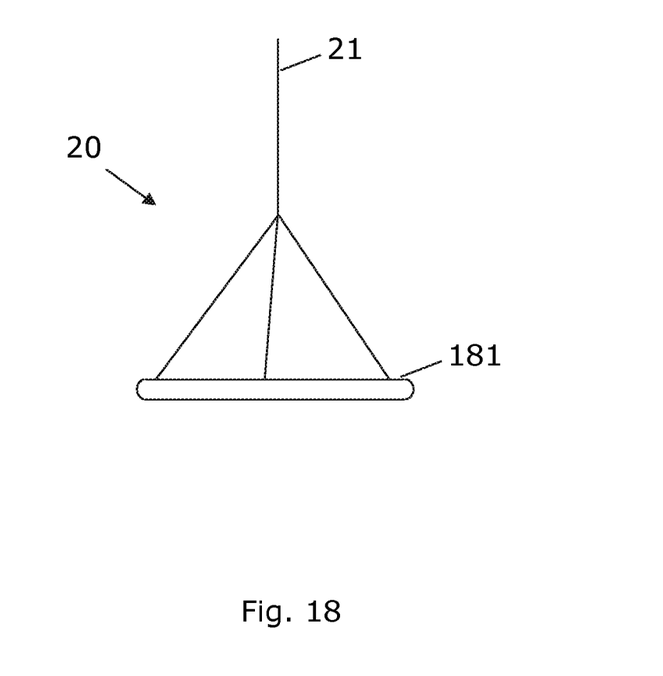

FIG. 18 illustrates an embodiment where one of the first and second bodies, in this case the first body 20 is constituted by a ring-shaped element, e.g. a torus shaped element 181 forming a central opening allowing water to pass through the first body.

Figure 19:
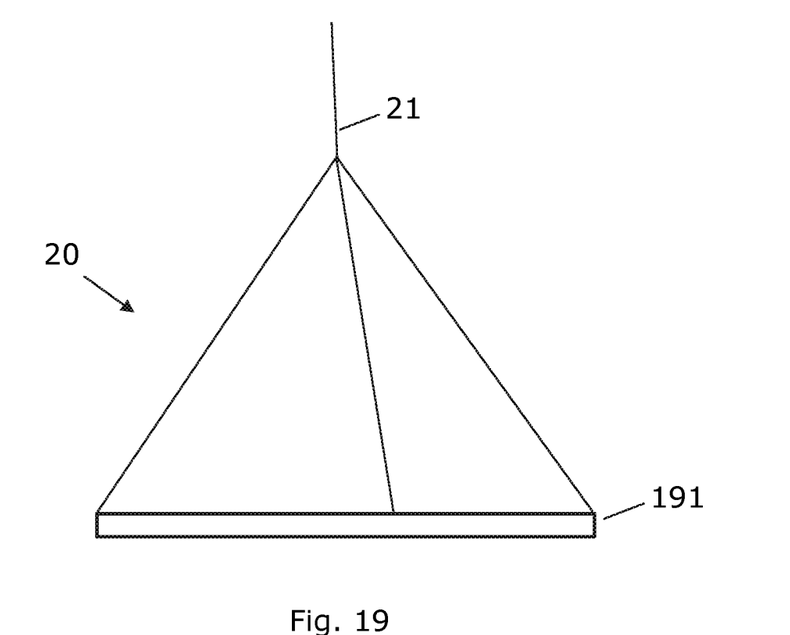
Figure 20:
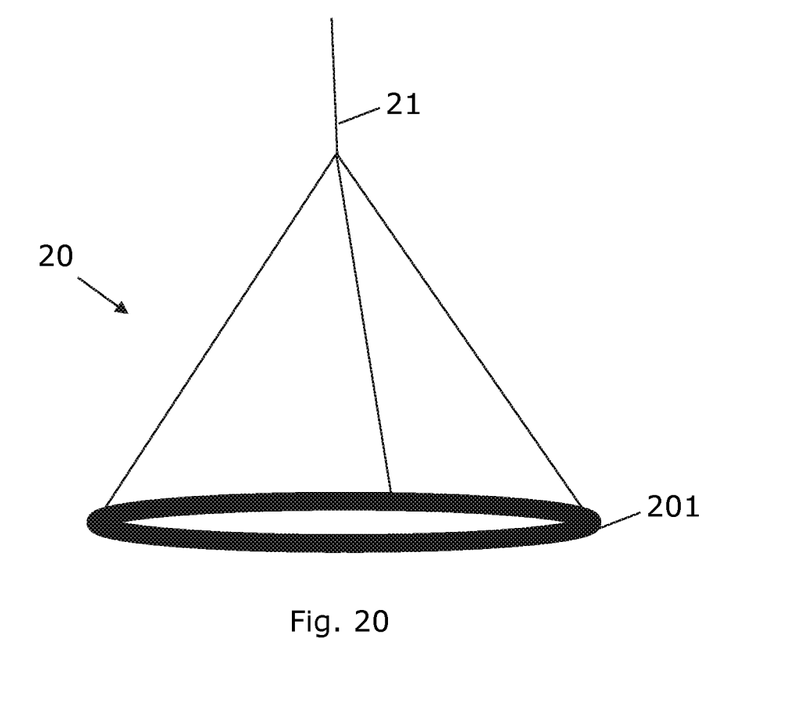

FIGS. 19-20 illustrate alternative shapes of the bodies 20 or 30.

Figure 21:
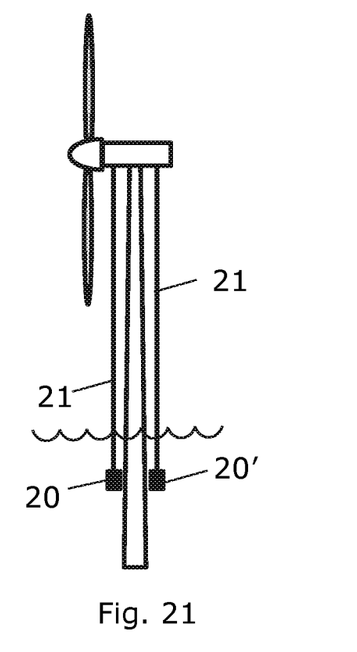

FIG. 21 illustrates an embodiment where at least one of the first and second bodies, in this case the first body 20, is supplemented by an additional first body 20' suspended in an additional wire 21'. The suspension points of the wires 21 and 21' are displaced in a direction transverse to the outwards direction of the load carrying structure away from the tower. The attachment points may e.g. be in the fore and after of the nacelle, or at two different points on the load carrying structure. Both the body and the additional body are at least partly submerged into the sea, and all the feature described relative to the first body 20 may apply likewise to the additional body 20'.

The combination between a body and an additional body provides a torsional dampening and may be particularly useful in relation to attachment of blades to the rotor during construction of the MR wind turbine.

The invention claimed is:

1. A method of dampening movement in a multiple rotor wind turbine located at sea and comprising a tower extending in an upwards direction, a load carrying structure forming a first section and a second section, the first and second sections extending in different directions away from the tower, the method comprising tethering a first body to the first section, the first body being at least partly submerged into the sea.

2. The method according to claim 1, comprising tethering a second body to the second section, the second body being at least partly submerged into the sea.

3. The method according to claim 2, further comprising removing at least one of the first body and the second body when the nacelle is mounted.

4. The method according to claim 1, carried out during assembly of the multiple rotor wind turbine, wherein a nacelle is mounted to the second section while the first body is tethered to the first section or while the second body is tethered to the second section.

5. The method according to claim 1, carried out during assembly of the multiple rotor wind turbine, wherein a nacelle is mounted to the first section while the first body is tethered to the first section or while the second body is tethered to the second section.

6. The method according to claim 1, wherein at least one of the first and second bodies is provided with a shape such that the drag coefficient in a vertical downwards direction is different from the drag coefficient in a vertical upward direction.

7. The method according to claim 6, wherein at least one of the first and second bodies is provided with a shape such that the drag coefficient is lower in a vertical downwards direction than in a vertical upwards direction.

8. The method according to claim 1, wherein at least one of the first and second bodies are configured to provide a sideways drag which is smaller than a vertical drag.

9. The method according to claim 1, wherein at least one of the first body and the second body has a tapering shape with a cross sectional area being reduced in a vertical downwards direction.

10. The method according to claim 1, wherein a shape of at least one of the first body and the second body is changed dynamically.

11. The method according to claim 1, wherein the shape is changed dynamically by flow of water over a surface of the body.

12. The method according to claim 1, wherein the shape is changed dynamically by a force acting on an attachment point by which the first body and/or the second body is tethered to the first section or second section by a wire.

13. The method according to claim 1, wherein at least one of the first body and the second body is non-buoyant.

14. The method according to claim 1, wherein at least one of the first body and the second body forms an essentially planner and horizontal surface portion.

15. The method according to claim 1, wherein at least one of the first body and the second body forms a cavity and wherein the cavity is filled with water when the body is submerged into the sea.

16. The method according to claim 1, wherein at least one of the first body and the second body is tethered from a tip end of the first section or the second section, the tip end terminating the load carrying structure away from the tower.

17. A multiple rotor wind turbine located at sea and comprising a tower extending in an upwards direction, a load carrying structure forming a first section and a second section, the first and second sections extending in different directions away from the tower, and at least one first body which is tethered by a wire to one of to the first section and second section, the at least one first body being at least partly submerged into the sea.

18. The multiple rotor wind turbine according to claim 17, wherein the first section and the second section are both configured for carrying a nacelle, and wherein the first section and the second section does not carry a nacelle.

19. The multiple rotor wind turbine according to claim 17, wherein the first section and the second section are both configured for carrying a nacelle, and wherein the first section carries a nacelle and the second section does not carry a nacelle.

20. The multiple rotor wind turbine according to claim 19, wherein the first body is tethered to the first section.

21. The multiple rotor wind turbine according to claim 19, wherein the first body is tethered to the second section.

22. The multiple rotor wind turbine according to claim 17, wherein the first body has a planar plate shape.

23. The multiple rotor wind turbine according to claim 17, wherein the first body is constituted by a plurality of planar plate shaped elements.

24. The multiple rotor wind turbine according to claim 17, wherein the first body has a shape which is curved, conical, parabolic, or semi-spherical.

25. The multiple rotor wind turbine according to claim 24, wherein the first body is oriented to create a smaller drag coefficient in a vertical downwards direction compared to a vertical upwards direction, due to the shape.

26. The multiple rotor wind turbine according to claim 17, wherein the first body is constituted by a plurality of curved, conical, parabolic, or semi-spherical elements.

27. The multiple rotor wind turbine according to claim 17, wherein the first body has a shape which is changed dynamically and provides a drag coefficient which is lower in a vertical downwards direction than in a vertical upwards direction.

28. The multiple rotor wind turbine according to claim 17, wherein the first body has perforations allowing water to penetrate from one side of the first body to an opposite side of the first body.

29. The multiple rotor wind turbine according to claim 17, wherein the first body comprises power driven means for establishing an upwards or downwards force, or a sideways force when submerged at least partly into the sea.

30. The multiple rotor wind turbine according to claim 17, wherein the first body comprises a controllable hatch structure allowing a controlled flow rate of water through one or more hatch openings from one side of the first body to an opposite side of the first body.

31. The multiple rotor wind turbine according to claim 30, wherein the controllable hatch structure is configured to provide a flow through the hatch opening(s) when the first body moves downwards, to facilitate a fast sinking, and to provide a reduced flow through the hatch opening(s) when the first body moves upwards, to facilitate a higher resistance against an upwards pull in the wire.

32. The multiple rotor wind turbine according to claim 17, comprising a second body which is tethered by a wire to one of the first section and the second section, the second body being at least partly submerged into the sea.

33. The multiple rotor wind turbine according to claim 32, wherein the second body has a mass, shape, and size at least one of which is different from the mass, shape and size of the first body.

\* \* \* \* \*